(12) United States Patent
Anderson

(10) Patent No.: US 8,234,505 B2
(45) Date of Patent: Jul. 31, 2012

(54) ENCRYPTION KEY IN A STORAGE SYSTEM

(75) Inventor: David Bruce Anderson, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 1518 days.

(21) Appl. No.: 11/337,142

(22) Filed: Jan. 20, 2006

(65) Prior Publication Data

US 2007/0192631 A1    Aug. 16, 2007

(51) Int. Cl.
G06F 21/00    (2006.01)
(52) U.S. Cl. .............. 713/193; 713/182; 726/2; 380/44; 380/264; 709/216; 705/71; 455/411
(58) Field of Classification Search .................. 713/193, 713/183
See application file for complete search history.

(56) References Cited

U.S. PATENT DOCUMENTS

| | | | |
|---|---|---|---|
| 5,915,025 A * | 6/1999 | Taguchi et al. ................ 380/44 |
| 6,457,126 B1 * | 9/2002 | Nakamura et al. ............ 713/166 |
| 6,473,861 B1 * | 10/2002 | Stokes .......................... 713/193 |
| 6,687,375 B1 * | 2/2004 | Matyas et al. ................. 380/45 |
| 6,968,459 B1 * | 11/2005 | Morgan et al. ................ 713/189 |
| 7,092,954 B1 * | 8/2006 | Ramesh ........................ 707/714 |
| 7,165,152 B2 * | 1/2007 | Blumenau et al. ............ 711/152 |
| 7,165,180 B1 * | 1/2007 | Ducharme .................... 713/182 |
| 7,397,917 B2 * | 7/2008 | Chen et al. ..................... 380/44 |
| 7,941,769 B1 * | 5/2011 | Hu ............................... 716/101 |
| 7,970,138 B2 * | 6/2011 | Cocchi et al. ................. 380/200 |
| 2002/0046342 A1 * | 4/2002 | Elteto et al. .................. 713/185 |
| 2002/0169960 A1 * | 11/2002 | Iguchi et al. ................. 713/174 |
| 2003/0009694 A1 * | 1/2003 | Wenocur et al. .............. 713/201 |
| 2003/0046593 A1 * | 3/2003 | Xie et al. ...................... 713/202 |
| 2004/0093505 A1 | 5/2004 | Hatakeyama et al. ......... 713/189 |
| 2004/0172532 A1 * | 9/2004 | Silverbrook .................. 713/161 |
| 2005/0147242 A1 * | 7/2005 | Rueping ........................ 380/28 |
| 2005/0262361 A1 | 11/2005 | Thibadeau |
| 2006/0025952 A1 * | 2/2006 | Buhr ............................ 702/108 |
| 2006/0034457 A1 * | 2/2006 | Damgaard et al. ............ 380/44 |
| 2006/0075262 A1 * | 4/2006 | Kim et al. ..................... 713/193 |

FOREIGN PATENT DOCUMENTS

| | | |
|---|---|---|
| JP | 10143441 A | 5/1998 |
| JP | 2002171504 A | 6/2002 |
| JP | 2004178312 A | 6/2004 |
| JP | 2005354602 A | 12/2005 |
| WO | 9938078 | 7/1999 |
| WO | 2004046935 A2 | 6/2004 |

OTHER PUBLICATIONS

Blum et al. "How to Generate Cryptographically Strong Sequences of Pseudo Random Bits", Department of Elecrical Engineering and Computer Sciences University of California—Berkeley, 1984, "http://www.csee.wvu.edu/~xinl/library/papers/comp/Blum_FOCS1982.pdf".*

(Continued)

*Primary Examiner* — Thanhnga B Truong
*Assistant Examiner* — Morshed Mehedi
(74) *Attorney, Agent, or Firm* — Cesari & Reed, LLP; Kirk A. Cesari

(57) ABSTRACT

A storage device has a storage medium, a key generator and a controller. The key generator generates an encryption/decryption key from selected bits of program code within the storage device. The controller controls access to the storage medium and applies the encryption/decryption key to encrypt and decrypt data written to or read from the storage medium.

19 Claims, 5 Drawing Sheets

OTHER PUBLICATIONS

A first Office Action corresponding to related Japanese Patent Application 2007009761 mailed Apr. 27, 2010.

A second Office Action corresponding to related Japanese Patent Application 2007009761 mailed Aug. 24, 2010.

* cited by examiner ized (typically within an attached computer system) perform the encryption and pass the encrypted data to the data storage device for storage. Recently, hardened security storage devices have been introduced, which perform at least a portion of the encryption/decryption operations within the storage device. Often such systems employ an encryption/decryption key that is stored in a non-volatile memory within the storage device, such as an electrically erasable programmable read only memory (EEPROM).

ENCRYPTION KEY IN A STORAGE SYSTEM

FIELD OF THE INVENTION

The present invention relates generally to data storage devices, and more particularly but not by limitation to encryption/decryption keys on data storage systems with no non-volatile key storage memory.

BACKGROUND OF THE INVENTION

Data storage devices typically provide a storage medium for storing user and other data. When it is desirable to protect such data from unauthorized access, software applications (typically within an attached computer system) perform the encryption and pass the encrypted data to the data storage device for storage. Recently, hardened security storage devices have been introduced, which perform at least a portion of the encryption/decryption operations within the storage device. Often such systems employ an encryption/decryption key that is stored in a non-volatile memory within the storage device, such as an electrically erasable programmable read only memory (EEPROM).

Unfortunately, data storage devices that employ an encryption key that is stored in such a non-volatile memory (or that is stored on a remote server, for example) can be susceptible to physical attack. For example, the encryption/decryption key may be discovered by intercepting and analyzing messages between the attached computer system and the data storage device. Alternatively, the key can be discovered by physically opening the storage device and probing the storage device itself. Some conventional applications have attempted to address the latter security hole by storing the encryption key in a memory that is erased when the storage device housing is opened. However, if it is known that such security measures are in place, it is possible to bypass the security feature and thereby thwart the protective measure.

Therefore, there is an ongoing need for secure data storage where the key is not susceptible to physical attack. Embodiments of the present invention provide solutions to these and other problems, and offer other advantages over the prior art.

SUMMARY OF THE INVENTION

A storage device dynamically generates an encryption/decryption key for use by the storage device. The storage device has a storage medium, a key generator and a controller. The key generator generates an encryption/decryption key from selected bits of program code within the storage device. The controller controls access to the storage medium and applies the encryption/decryption key to encrypt and decrypt data written to or read from the storage medium.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
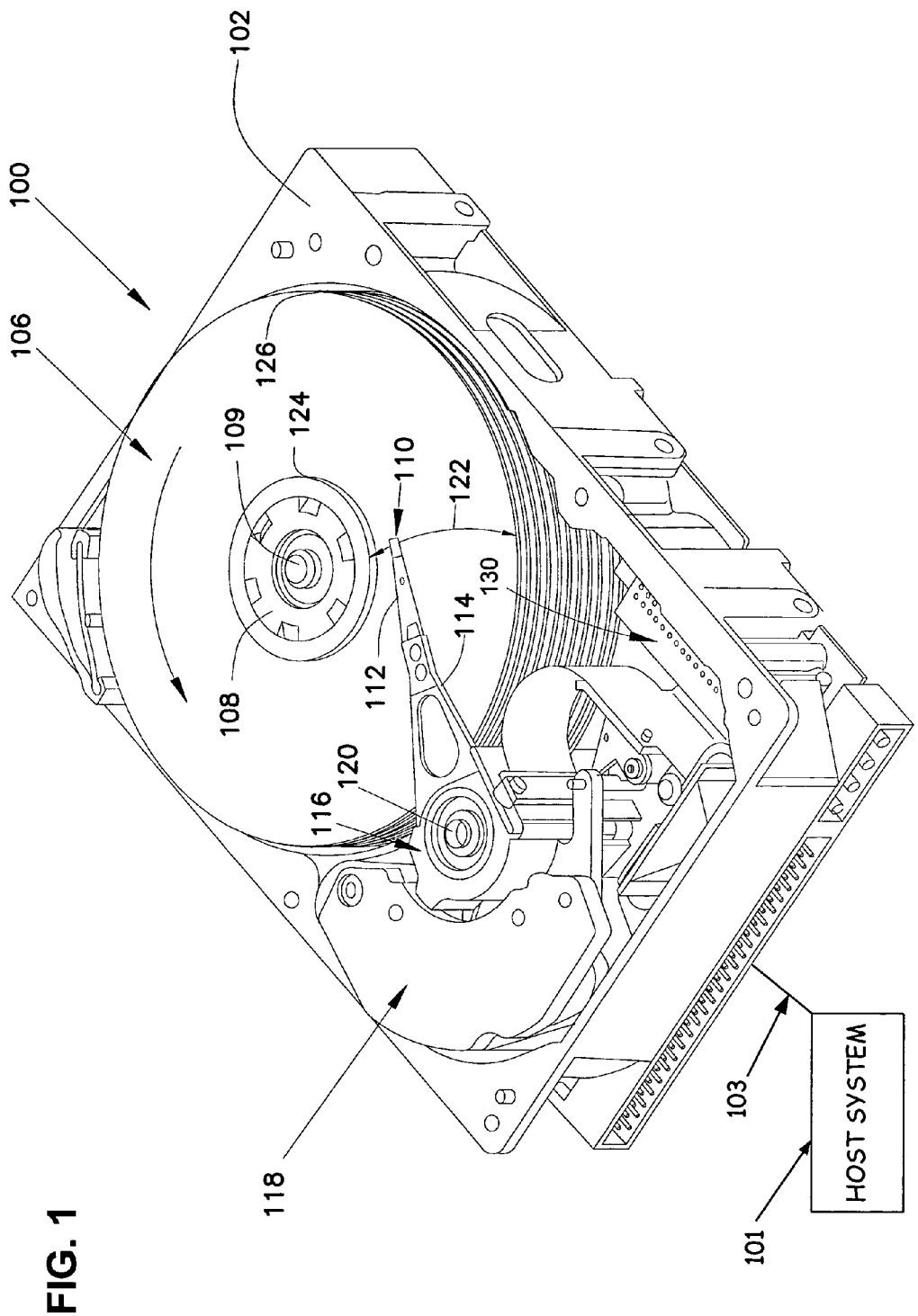
FIG. 1 is an isometric view of a disc drive.

FIG. 1 is an isometric view of a disc drive 100, which is an exemplary data storage device. Disc drive 100 is operably coupled to a host system 101 through interface 103. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and host system 101.

Figure 2:
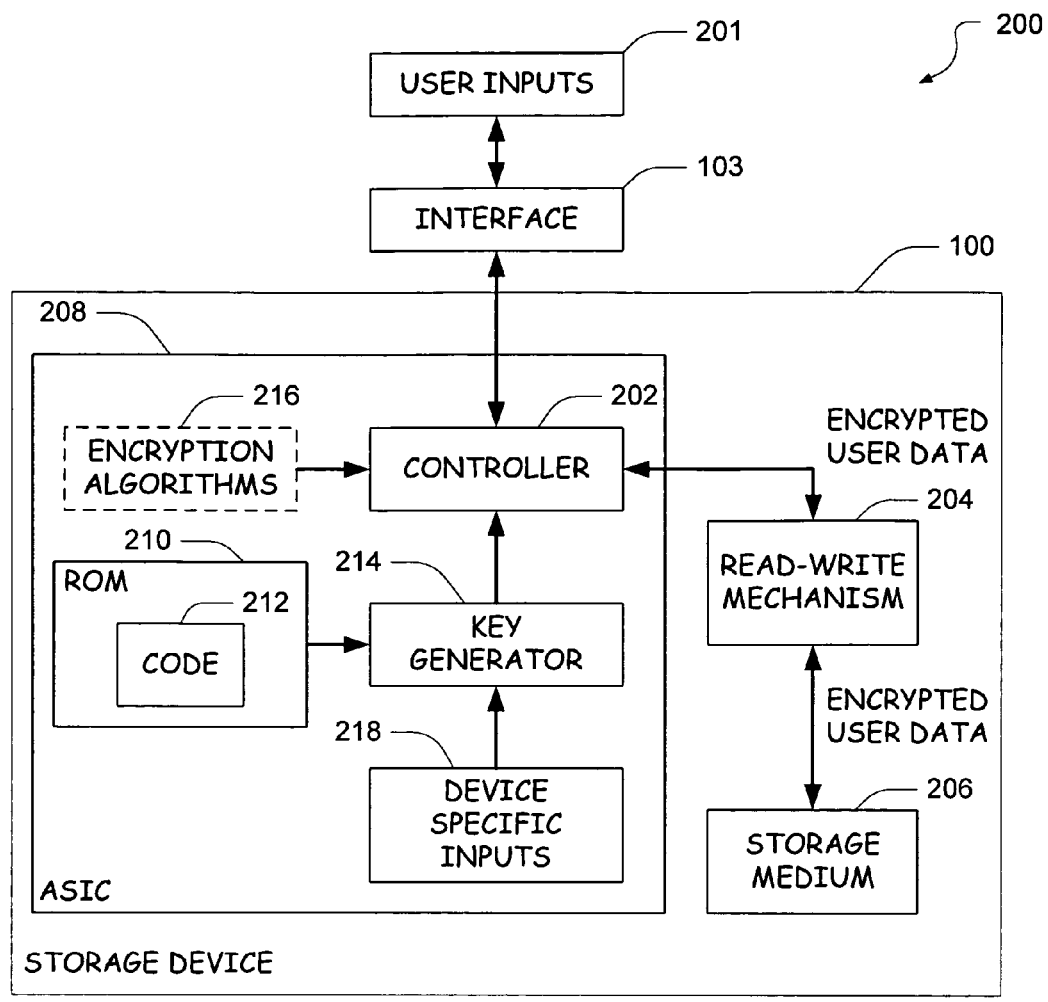
FIG. 2 is a simplified block diagram of a storage device.

FIG. 2 is a simplified block diagram of a storage system 200. The system 200 includes a storage device 100 with an interface 103 through which user inputs 201 are received. The storage device 100 includes a controller 202, a read-write mechanism 204, and storage medium 206. In one embodiment, controller 202 can be included in circuitry 130 of the storage device 100 indicated generally in FIG. 1. Additionally, read-write mechanism 204 and storage medium 206 can correspond to transducer heads 110 and discs 106 (shown in FIG. 1), respectively.

In one embodiment, controller 202 can be implemented as part of an application specific integrated circuit (ASIC) 208. The ASIC 208 includes a read-only memory (ROM) 210 that stores program code 212, which is installed or written to the ROM 210 during manufacturing. Program code 212 can include boot level program code accessed by the storage device 100 on startup, for example. The program code 212 generally remains unchanged over time. ASIC 208 also includes a key generator 214 and optimally includes encryption algorithms 216 and device specific inputs 218.

The key generator 214 produces an encryption/decryption key based in part on information contained within the ASIC 208. For example, the key generator 214 can produce the encryption/decryption key based on device specific inputs 218 such as, for example, a reader head resistance, a writer coil resistance, a drive serial number, or other device specific information, including random outputs of comparator bits within the ASIC 208. The encryption/decryption key can be generated based on a bit map as discussed below. The controller 202 utilizes the encryption algorithms 216 and the encryption/decryption key to encrypt user data. The encrypted user data can then be written to the storage medium 206 via the read-write mechanism 204.

In general, by generating an encryption/decryption key entirely within ASIC 208, the encryption/decryption key cannot be ascertained by probing. Moreover, since the key can be generated dynamically, there is no stored key to be discovered. The hash value of the key, even if it is recovered, cannot be used to recreate the encryption/decryption key. Since data entering the storage device is processed within the ASIC 208, the key is not revealed to devices external to the storage device 100.

Figure 3:
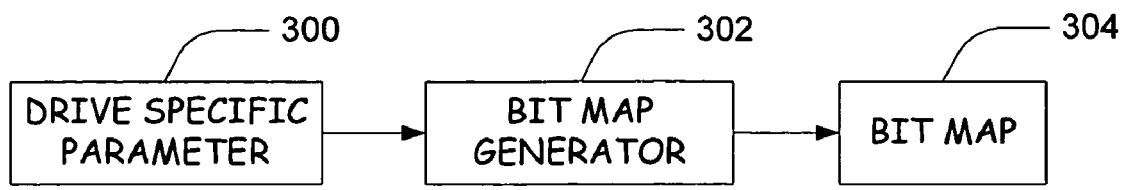
FIG. 3 is a simplified flow diagram of a process for creating a bit map.

FIG. 3 is a simplified flow diagram of a process for producing a bit map. As shown, a drive specific parameter 300 is processed by a bit map generator 302 to produce a bit map 304. For example, a serial number of the storage device can be processed by bit map generator 302 to construct a bit map for constructing the encryption/decryption key. In one embodiment, the bit map generator 302 applies an algorithm for selecting some bits from the drive specific parameter 300. The drive specific parameter 300 can include the device serial number, and/or device specific parameters such as a read head resistance, a write coil resistance, and the like. Alternatively, combinations of such device specific parameters can be used.

Figure 4:
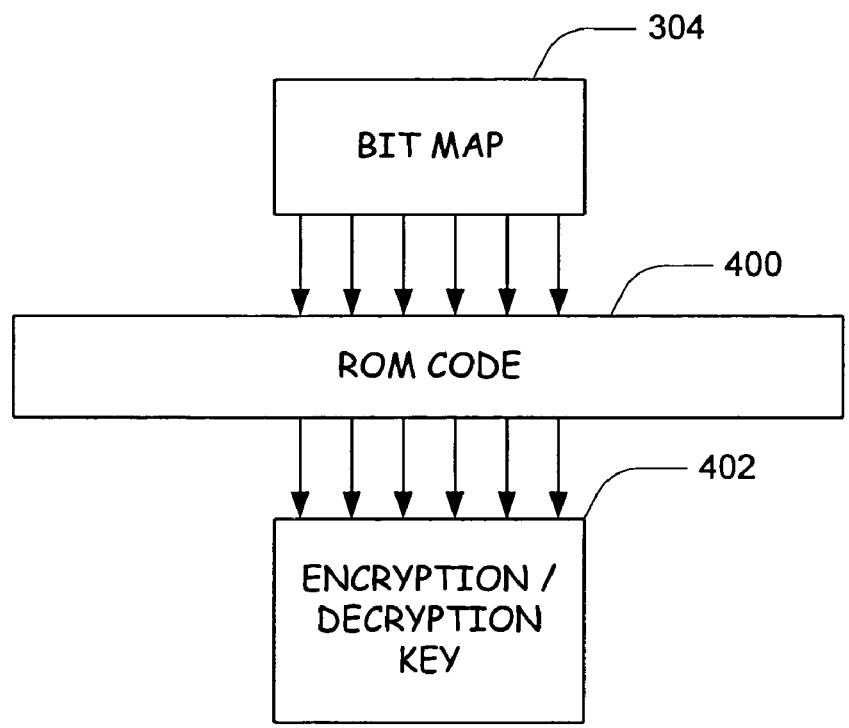
FIG. 4 is a simplified flow diagram of a process for creating an encryption/decryption key using the bit map of FIG. 3.

FIG. 4 is a simplified flow diagram for using the bit map to produce an encryption/decryption key. The bit map 304 is applied to, for example, ROM code 400 stored within the read only memory of the storage device to select certain bits of the ROM code 400 which can be used as an encryption/decryption key 402. For example, a portion of the ROM code 400 can be processed against the bit map 304 using a logical operation, such as an exclusive-OR, a NAND, an AND, or other such operations. Alternatively, the ROM code 400 can be concatenated with the bit map 304 to produce the encryption decryption key 402. Other techniques for deriving the encryption/decryption key 402 using the bit map 304 and the ROM code 400 can also be used.

One advantage of applying the bit map 304 to the ROM code 400 is that the resulting bit string is produced entirely within the storage device, and preferably entirely within an ASIC. The resultant bit string can be the encryption/decryption key or can then be assembled into a key, depending on the specific implementation. As long as the ROM code 400 is kept secret, the encryption/decryption key is kept secret.

In some conventional hard disc drives, expensive non-volatile memory is often used to maintain keys to be used when encrypting or decrypting information. Unfortunately, the memory is usually attached to the rest of the electronics by an electronic data path which can be observed using appropriate instruments (such as a probe), which allows the key to be exposed to theft. Additionally, the memory adds a fixed production cost to the device, which cannot always be justified on the basis of something as small and infrequently used as an encryption key.

Embodiments of the present invention provide a simple solution to this problem. Namely, the resulting encryption/decryption key is dynamically produced by the storage device and is known only within the storage device itself (or more specifically within the ASIC 208). For cost sensitive applications such as hard disc drives, the present invention enables security functions to be supported with a minimal additional cost. Specifically, the drive specific information, such as the serial number, are already within conventional devices, as is the ROM code required to operate the storage device on startup. Thus, embodiments of the present invention provide a means for generating a secure key dynamically, so that related security enhancements can be provided with minimal additional cost or effort.

Figure 5:
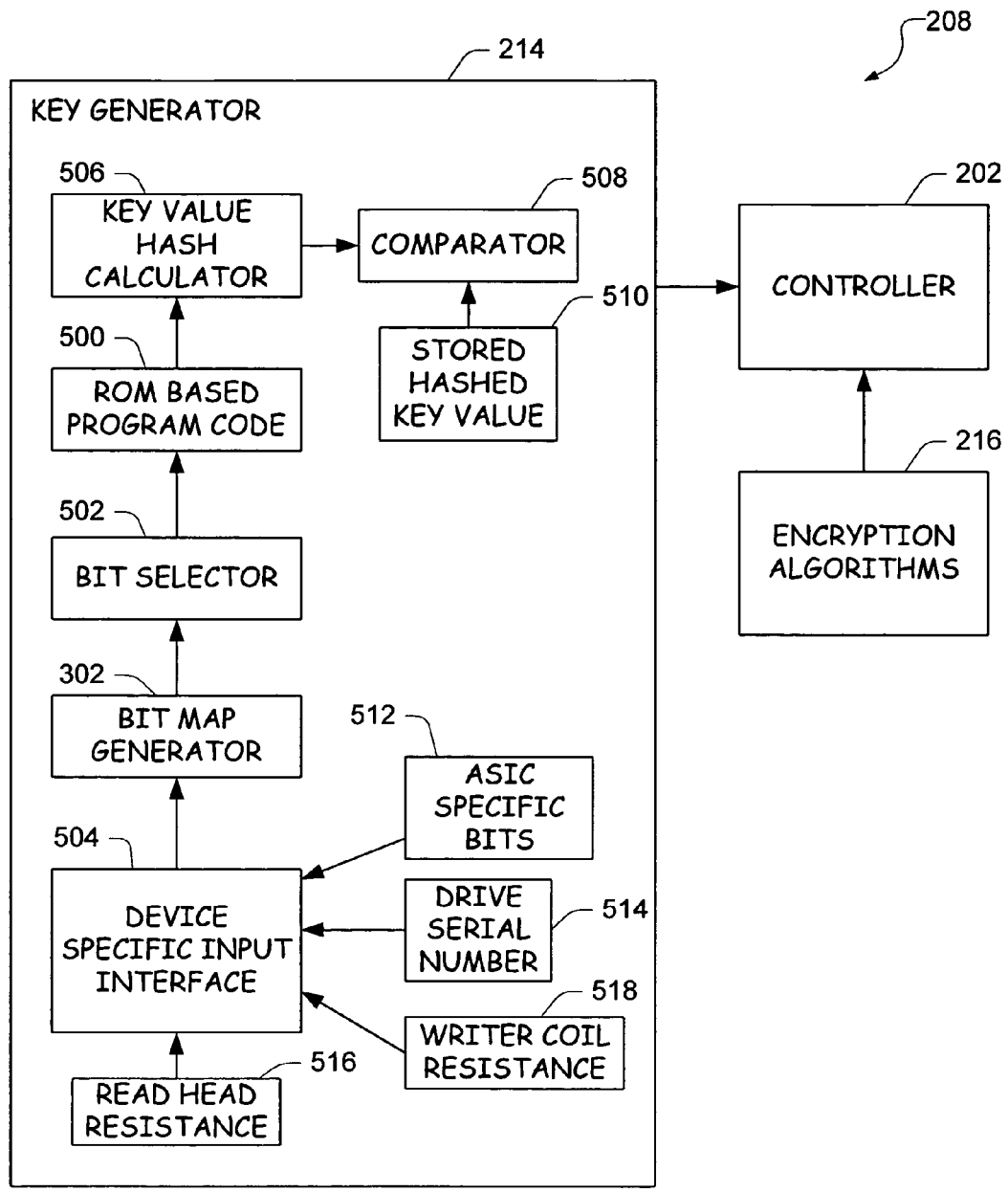
FIG. 5 is an expanded block diagram of a storage device.

FIG. 5 is an expanded block diagram of application specific integrated circuit 208. As discussed above, the application specific integrated circuit 208 includes a controller 202, encryption algorithms 216, and a key generator 214. The key generator 214 includes ROM based program code 500, bit selector 502, bit map generator 302, a device specific input interface 504, a key value hash calculator 506, a comparator 508, and a stored hashed key value 510. In general, the device specific input interface 504 receives one or more inputs such as ASIC specific bits 512, drive serial number 514, writer coil resistance 518, and/or read head resistance 516. The received inputs are processed by the device specific input interface and passed to a bit map generator 302 which generates a bit map from the inputs. A bit selector 502 applies the bit map to ROM based program code 500 within the storage device to generate a key/bit sequence. The key bit sequence is processed by a key value hash calculator 506 to produce a hashed key value, which is then compared to a stored hash key value 510 by comparator 508. This verification process confirms that the hashed key value corresponds to the previous hashed values of the encryption key.

In particular, it is important that the key not vary over time so that data can be stored and then accessed by the controller 202 when desired. If the bit values change, data on the storage medium becomes inaccessible to the controller 202 because the decryption key would be lost. Consequently, the comparator 508 compares the hashed key value from the newly created key bit sequence against a stored hash value prior to forwarding the key to the controller 202.

Figure 6:
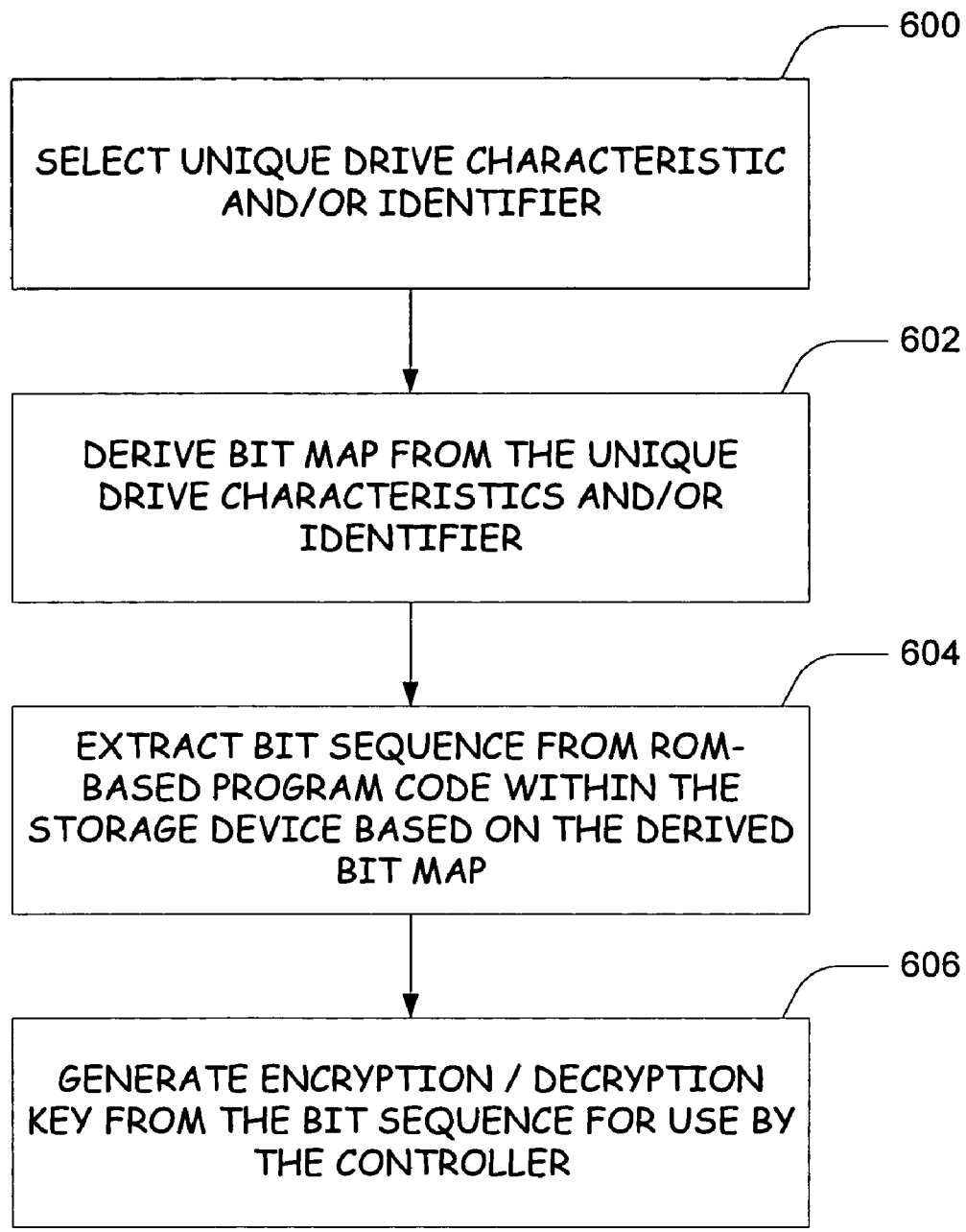
FIG. 6 is a simplified flow diagram of a process for generating an encryption/decryption key.

FIG. 6 is a simplified flow diagram of a processor generating an encryption/decryption key. First, a unique drive characteristic and/or identifier is selected (step 600). This selection process may occur at a manufacturer or may be affected by the first owner of a storage device upon startup. For example, the manufacturer or device owner may specify which device specific parameter or combination of parameters should be used to generate the encryption/decryption key. The storage device derives the bit map from the unique drive characteristic and/or identifier (step 602). A bit sequence is extracted from ROM-based program code within the storage device based on the derived bit map (step 604). Finally, an encryption/decryption key is generated from the bit sequence for use by the controller (step 606).

As previously discussed, additional steps, such as hashing the generated encryption/decryption and comparing the hashed key value against a stored hash value may be added to the process in order to verify a key before use by a controller within the storage device. Additionally, a user key, a fingerprint or other user-specific information may be incorporated into a key to encrypt data for user-specific application. In one embodiment, for example, a fingerprint device may be utilized for generating a unique fingerprint-based digital signature that can be concatenated with the extracted bit sequence to produce the encryption/decryption key. In that embodiment, data stored on the storage device is accessible only to a user with that fingerprint.

Embodiments of the present invention provide advantages over stored key systems where the key is provided to the controller by electronic loop or connection. Such conventional systems can be hacked or sniffed to identify the key by tapping the appropriate wire connection. By generating a key dynamically from information stored entirely within the storage device and by maintaining the key within an application-specific integrated circuit, there is no exposed wire to be tapped. Consequently, the key is dynamically generated and used by the controller in a much more secure manner.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the key generating system while maintaining substantially the same functionality without departing from the scope and spirit of the present invention. In addition, although the preferred embodiment described herein is directed to a dynamic key generation system for encrypting and decrypting data with a data storage device, it will be appreciated by those skilled in the art that the teachings of the present invention can be applied to any system that uses an encryption/decryption key for which protection of the key is desirable, without departing from the scope and spirit of the present invention.

What is claimed is:

1. A device comprising:
an encryption key generator adapted to generate an encryption key including:
a bit map generator adapted to generate a bit map from a characteristic of the device;
a bit selector adapted to generate select bits from program code within the device based on the bit map;
wherein the encryption key includes the select bits; and
a controller adapted to apply the encryption key to encrypt data.

2. The device of claim 1 and further comprising:
encryption algorithms within the device for use by the controller to encrypt data using the encryption key.

3. The device of claim 1 wherein the key generator and the controller comprise circuit elements of an application specific integrated circuit and the bit map comprises more than one byte.

4. The device of claim 1 wherein the key generator comprises:
a device specific input interface adapted to receive device specific inputs from one or more components of the device, wherein the key generator is adapted to generate the bit map based on the device specific inputs.

5. The device of claim 1 further comprising:
a key value hash calculator adapted to generate a hashed key value based on the encryption key; and
a comparator adapted to compare the hashed key value to a stored hash value to determine if the encryption key is the same as a previously used encryption key.

6. A method comprising:
generating a decryption key including:
deriving a bit map from at least one characteristic of a device;
generating a bit sequence from program code within the device based on the bit map; and
generating the decryption key based on the bit sequence.

7. The method of claim 6 further comprising generating an encryption key by applying the bit map to the program code.

8. The method of claim 6 and further comprising:
decrypting data based on the decryption key.

9. The method of claim 6 wherein the at least one device characteristic comprises: resistance information from a transducer head of the device.

10. The method of claim 6 wherein the at least one device characteristic comprises: a unique serial number of the storage device.

11. The method of claim 6 and further comprising:
cryptographically combining more than one device characteristic to form the decryption key.

12. A storage device comprising:
a storage medium; and
an integrated circuit comprising:
a key generator comprising:
a bit map generator adapted to generate a bit map based on a characteristic of the storage device; and
a bit selector adapted to generate a bit sequence from program code based on the bit map;
a key calculator adapted to generate an encryption key based on the bit sequence; and
a controller adapted to encrypt data using the encryption key.

13. The storage device of claim 12 wherein the bit sequence comprises the encryption key.

14. The storage device of claim 12 wherein the characteristic of the storage device comprises: a resistance of a transducer head of the storage device.

15. The storage device of claim 12 wherein the characteristic of the storage device comprises: a unique serial number of the storage device.

16. The storage device of claim 12 wherein the encryption key exists only within the integrated circuit.

17. The device of claim 4, wherein:
the device comprises a data writing mechanism; and
at least one of the device specific inputs comprises a resistance of the data writing mechanism.

18. The device of claim 1, further comprising:
the characteristic of the device comprises a serial number of the device.

19. The storage device of claim 12, wherein the program code is program code of the integrated circuit.

* * * * *